May 28, 1957     F. T. STROHM     2,793,488
MOWER BAR WITH OSCILLATING CUTTER ELEMENTS
Filed June 1, 1955
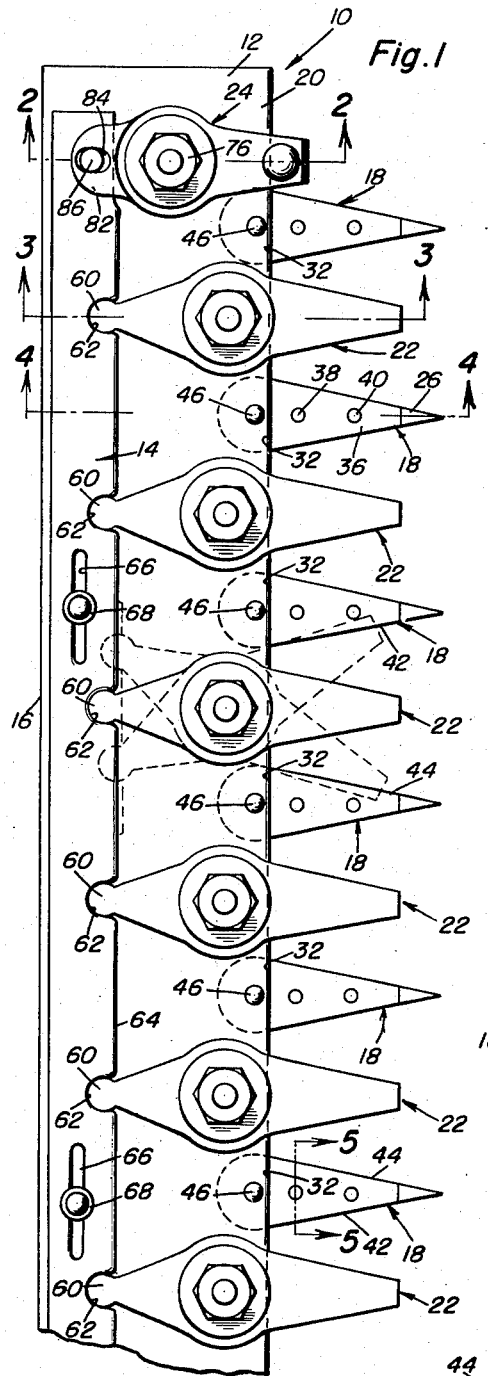
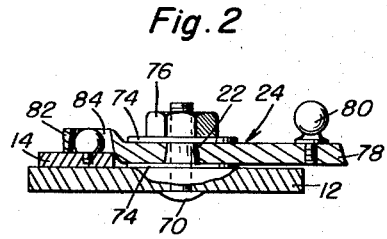
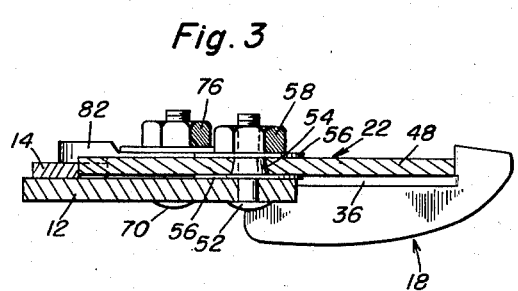
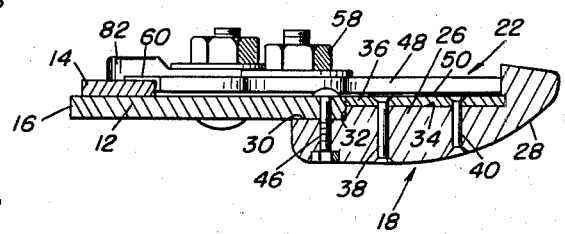
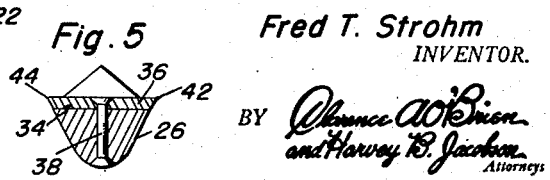
Fred T. Strohm
INVENTOR.
BY *Clarence A. O'Brien*
*and Harvey B. Jacobson*
Attorneys

2,793,488

MOWER BAR WITH OSCILLATING CUTTER ELEMENTS

Fred T. Strohm, Martinsville, Ill.

Application June 1, 1955, Serial No. 512,389

1 Claim. (Cl. 56—293)

This invention relates generally to harvester apparatus and is more particularly concerned with an improved mower bar construction.

The primary object of invention is to provide an elongated mower bar construction including a plurality of spaced fixed guide fingers secured on the forward edge portion of said bar, fixed horizontal cutter plates secured on an upper surface of said guide fingers, said cutter plates having opposite sharpened upper edge portions, and pivotal cutter members journalled intermediate adjacent pairs of said guide fingers, the pivotal cutter members including opposite sharpened edge portions cooperating with the adjacent sharpened edge portion of a horizontal cutter plate on one of said guide fingers.

A further object of invention in conformance with that set forth above is to provide on a mower bar of the character set forth a reciprocable force transmitting bar pivotally connected to the pivotal cutter members whereby said pivotal cutter members define an arcuate scissorslike cutting path relative to the horizontal cutter plates on said guide fingers.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 1 is a top plan view of a portion of the novel mower bar construction;

Figure 2 is an enlarged sectional view taken substantially on line 2—2 of Figure 1 showing the connection for the drive means for the mower bar construction;

Figure 3 is an enlarged sectional view taken substantially on line 3—3 of Figure 1, said view being taken through one of the pivotal cutter members;

Figure 4 is an enlarged sectional view taken substantially on line 4—4 of Figure 1, said view being taken through one of the fixed guide fingers; and Figure 5 is an enlarged sectional view taken substantially on line 5—5 of Figure 1 showing a horizontal fixed cutter blade relative to the guide fingers.

The mower bar construction as indicated generally at 10 includes an elongated generally horizontally disposed mower bar 12, which has reciprocably mounted thereon a horizontal drive bar 14, adjacent the rear edge 16 of the bar 12, a plurality of fixed guide fingers 18 secured adjacent the front edge 20 of said bar, a plurality of pivotal cutter elements 22 pivotally supported intermediate adjacent pairs of fixed guide fingers, and a force transmitting lever element 24 adapted to be connected to a suitable drive pitman (not shown).

The guide fingers 18 include an elongated ground engaging element 26 which has an upwardly curved forward edge 28 for reducing friction during movement of the mower bar construction along the ground, said forward edge being pointed, as seen in Figure 1, to permit the penetration of the mower bar construction into a matted crop, said element 26 including a rearwardly disposed notched out portion 30 which includes a vertical shoulder portion 32 which is engageable against the forward edge 20 of the bar 12, said vertical edge 32 intersecting a horizontal fixed cutter blade supporting surface 34 on said element 26. A fixed cutter blade 36 is supported in juxtaposition on the surface 34 of the guide fingers, being secured thereto by means of securing rivets 38 and 40 which extend through the cutter blade 36 and the ground engaging element 26, the upper surface of the fixed cutter blade 36 being in horizontal alignment with the mower bar 12. The cutter blade 36 includes on its opposite upper edges a sharpened cutting edge portion 42 and 44, and the ground engaging element 26 is secured to the forward edge 20 of the bar 12 by means of suitable connecting bolt 46 which extends through suitable apertures in the ground engaging element 26 and the mower bar 12, the shoulder 32 being in engagement with the forward edge 20 of the mower bar, and thus retaining the ground engaging elements 26 of the guide fingers 18 in a relatively fixed position on the mower bar 12.

The pivotal cutter elements 22 each include an elongated forwardly tapering portion 48 which has opposite lower sharpened edge portions 50 which cooperate with the cutter edge portion 42 or 44 of adjacent pairs of fixed guide fingers 18, the cutter element 22 being pivotally supported on an intermediate portion thereof on a suitable pivot bolt element 52 which includes an upwardly tapered journal portion 54 which cooperates with a suitable tapered recess in the cutter elements. Suitable washers 56 may be disposed upon the bolt 52 on opposite sides of the pivotal cutter member 22, and a suitable securing nut 58 may be threadedly secured on said bolt 54. As seen in Figure 1, the pivotal cutter element 22 rotates on the pivot bolt 52 as shown by the dotted lines, wherein the lower oppositely disposed cutting edges 50 thereof are pivoted through an arcuate path wherein said cutter edges cooperating with a cutting edge 44 or 42 of the fixed cutter plates 36, and material being harvested passes between adjacent pairs of the guide fingers and cut by the pivotal cutter elements 22 in what may be described as a "scissors' action" which applies a gradual shear to the harvested material contrary to the sudden shock or chopping action that is experienced when a mower bar is utilized which incorporates a movable cutter moving substantially at right angles to a fixed cutter plate.

The rear ends of the pivotal cutter elements 22 are tapered and define rounded rear end portions 60 which are pivotally received in circular notched out portions 62 contained in the forward edge 64 of the reciprocating drive bar 14.

The drive bar 14 includes extending therethrough a plurality of elongated slotted portions 66 which permit the reciprocable movement thereof relative to the mower bar 12, said drive bar 14 being secured to the mower bar 12 by means of suitable bolt assemblies 68 extending through the slot 66 being secured to the mower bar 12.

The force transmitting lever element 24 is pivotally mounted on a bolt element 70 at one end of the mower bar 12, said bolt element including a tapered portion received within a suitable aperture in the force transmitting lever 24, and suitable washers 74 provided on opposite sides of the force transmitting lever element 24, the force transmitting lever element 24 being secured on the bolt 70 by means of a suitable securing nut 76. The lever element 24 includes secured to its forward end portion 78 and extending upwardly therefrom a suitable swivel ball element 80 which will be connected to a drive pitman (not shown) in a manner well known and old in the art. The opposite end of the lever element 24 includes a collar forming portion 82 which overlies the drive bar 14, and encloses therein in an elongated slotted portion 84 a swivel ball element 86 suitably secured and extending upwardly from the drive bar 14. It is believed readily apparent that pivotal movement of the lever element 24 results in a reciprocating movement being imposed upon the drive bar 14, thus driving the pivotal cutter elements 22 in an arcuate path and "scissors' like" motion over the adjacent cutting edges of the fixed cutter elements whereby there is available a mower bar construction which is highly efficient in heavily matted material being harvested with a relatively small amount of shock to the movable parts.

Various positional directional terms such as "front," "rear," "top," etc., are utilized herein to have only a relative connotation to aid in describing the device and are not intended to require any particular orientation with respect to any external elements.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

In a mower bar construction comprising an elongated mower bar having a flat upper surface, a plurality of fixed guide fingers secured in spaced relationship to each other and at a forward edge of said mower bar and extending both forwardly and downwardly therefrom, fixed cutter plates on individual fixed guide fingers and flush with the upper surface of said mower bar, said cutter plates each having opposite upper sharpened side edges, cutter elements pivotally mounted on said surface of said mower bar and located between adjacent guide fingers of pairs of said guide fingers and cooperable with the fixed cutter plates on said guide fingers, said cutter elements having opposite lower sharpened side edges which are movable into an overlying relationship to two adjacent and flanking cutting edges of fixed cutting plates, drive means operatively carried on said surface of said mower bar for urging said pivotal cutter elements in an arcuate path to overlap said fixed cutter plates on said guide fingers, said drive means including a reciprocating elongated drive bar mounted adjacent the rear edge and on the top surface of said mower bar, means pivotally connecting the rear part of said cutter elements to said drive bar for actuating said cutter elements in unison with respect to the guide fingers, said connecting means comprising rounded rear end portions on said cutter elements, said drive bar being provided with forwardly opening sockets accommodating said rounded rear end portions of said movable cutter elements in order to establish a drive connection between said reciprocating drive bar and said movable cutter elements, a force transmitting lever pivotally connected at an intermediate point on one end of said elongated mower bar and having a slot near one end, a pin on said one end of said drive bar and drivingly connected in said slot, the other end of said force transmitting lever having means for connection to a drive pitman, said fixed guide fingers each comprising an elongated ground engaging element having an upwardly curved forward edge for reducing friction during movement of the mower bar along the ground and having a lower surface which is transversely curved, said forward edge of said ground engaging element being pointed for penetration of the mower bar into a matted crop, said ground engaging element having a rearwardly disposed notch which opens vertically upward, said notch having steps on one of which one of said cutter plates is disposed and on the other of which the lower front surface of said elongated cutter bar is nested, a shoulder separating the steps of said recess and abutting the front edge of said elongated mower bar, said cutter plates having their upper surfaces coplanar with the upper surface of said mower bar.

References Cited in the file of this patent

UNITED STATES PATENTS

| | | |
|---|---|---|
| 724,275 | Flower | Mar. 31, 1903 |
| 1,604,726 | Stauter | Oct. 26, 1926 |
| 2,025,537 | Tauber | Dec. 24, 1935 |
| 2,448,078 | Brown | Aug. 31, 1948 |
| 2,590,788 | Novak | Mar. 25, 1952 |
| 2,685,162 | Head | Aug. 3, 1954 |